B. F. MILLER.

Assignor to J. Brinkerhoff.

CORRUGATED FENCE-PICKET.

No. 7,562. Reissued March 20, 1877.

Witnesses:

P. C. Dieterich

Frank H. Duffy

Inventor:

Benj. F. Miller,

Per: C. H. Watson & Co. Attorneys.

N. PETERS, PHOTO-LITHOGRAPHER, WASHINGTON, D. C.

UNITED STATES PATENT OFFICE.

BENJAMIN F. MILLER, OF NEW YORK, N. Y., ASSIGNOR TO JACOB BRINKERHOFF.

IMPROVEMENT IN CORRUGATED FENCE-PICKETS.

Specification forming part of Letters Patent No. 43,644, dated July 26, 1864; reissue No. 7,562, dated March 20, 1877; application filed January 5, 1877.

*To all whom it may concern:*

Be it known that I, BENJAMIN F. MILLER, of New York, in the county of New York and State of New York, have invented certain new and useful Improvements in Corrugated Fence-Pickets; and I do hereby declare that the following is a full, clear, and exact description thereof, that will enable others skilled in the art to which it appertains to make and use the same, reference being had to the accompanying drawings, and to the letters of reference marked thereon, which form a part of this specification.

This invention relates to fences; and has for its object to produce a fence light and durable in use, and not liable to get out of repair, and, at the same time, possessing sufficient strength; and it consists in sheet corrugated metallic material, and in the same provided with points for fencing purposes, as will be hereinafter more fully described.

I am aware that wooden pickets and cast-metal posts and rails, both angular and corrugated, have heretofore been made; but this forms no part of my invention.

Figure 1:
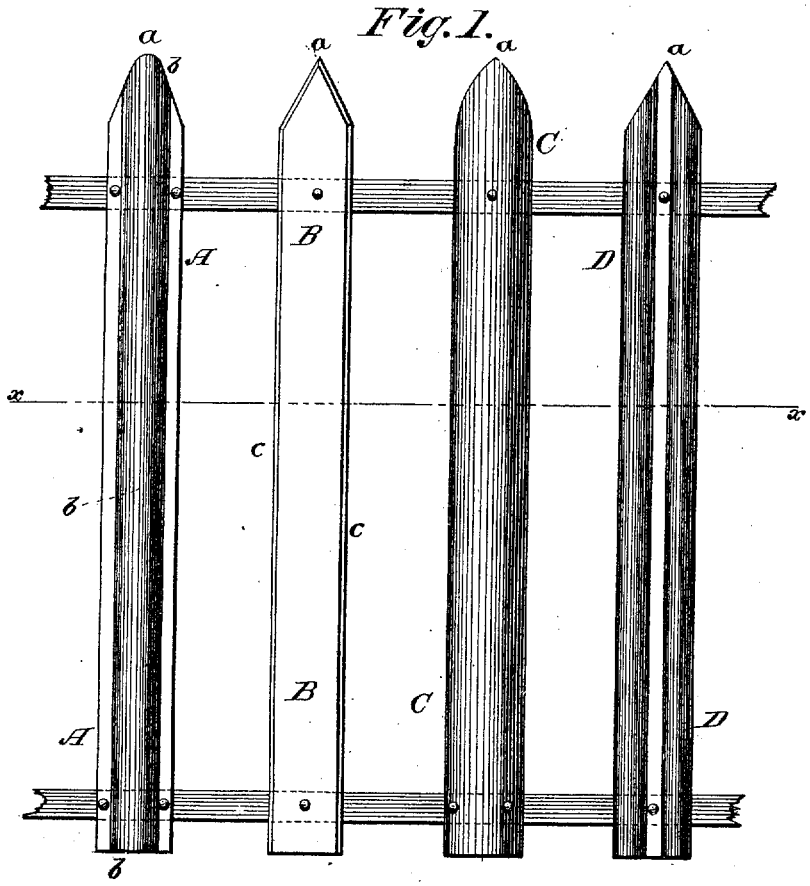
Figure 2:
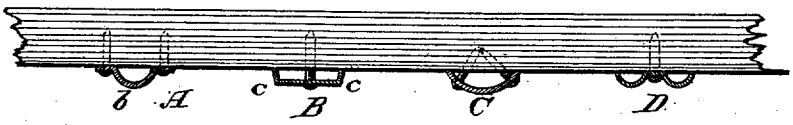

In the annexed drawing, Figure 1 represents a side elevation, and Fig. 2 represents a section, taken on line *x x* of Fig. 1, of a device embodying my invention.

A represents a sheet-metal fencing-picket, with a flanged corrugation, *b* B, a picket with flanges *c* on each edge, turned or bent off nearly at right angles; C, a curved or half-round picket, having a central corrugation, and D a picket with a corrugation near the edge. The corrugations run lengthwise of the pickets, which strengthen the material.

The tops of the pickets are provided with points *a*, which are corrugated the same as the other part of the pickets, which gives additional strength to said points, which is necessary when thin metal is used.

Having thus fully described the invention, what is claimed as new, and desired to be secured by Letters Patent, is—

1. The sheet metallic corrugated picket or pickets, part or parts A B C D for fencing purposes, substantially for the purpose herein specified.

2. The sheet metallic picket or pickets, part or parts A B C D for fencing, having corrugated points, for the purpose described.

3. Sheet metallic picket or pickets, part or parts A B C D for fencing, provided with corrugations or flanges and corrugated points, for the purpose set forth.

In testimony that I claim the foregoing I have hereunto set my hand this 4th day of January, 1877.

BENJAMIN F. MILLER.

Witnesses:
C. H. WATSON,
THOMAS WADELTON.